(12) United States Patent
Pearson et al.

(10) Patent No.: US 11,599,479 B2
(45) Date of Patent: Mar. 7, 2023

(54) TECHNOLOGY FOR FINE-GRAIN ENCRYPTION AND SECURE KEY INJECTION ON SELF-ENCRYPTING DRIVES

(71) Applicant: Intel Corporation, Austin, TX (US)

(72) Inventors: Adrian Robert Pearson, Beaverton, OR (US); David Ray Noeldner, Fort Collins, CO (US); Niels Juel Reimers, Folsom, CA (US); Emily Po-Kay Chung, Cupertino, CA (US); Gamil Assudan Cain, El Dorado Hills, CA (US); Thomas Rodel Bowen, Hillsboro, OR (US); Teddy Gordon Greer, Freemont, CA (US); Jonathan Martin Hughes, Longmont, CO (US)

(73) Assignee: Intel Corporation, Santa Clara, CA (US)

( * ) Notice: Subject to any disclaimer, the term of this patent is extended or adjusted under 35 U.S.C. 154(b) by 917 days.

(21) Appl. No.: 16/406,074

(22) Filed: May 8, 2019

(65) Prior Publication Data

US 2019/0266103 A1 Aug. 29, 2019

Related U.S. Application Data

(60) Provisional application No. 62/668,844, filed on May 9, 2018.

(51) Int. Cl.
*G06F 12/14* (2006.01)
*G06F 3/06* (2006.01)
(Continued)

(52) U.S. Cl.
CPC ........ *G06F 12/1408* (2013.01); *G06F 3/0622* (2013.01); *G06F 3/0637* (2013.01);
(Continued)

(58) Field of Classification Search
CPC ............ G06F 12/1408; G06F 12/1466; G06F 12/0238; G06F 3/0622; G06F 3/0637; G06F 3/0679; H04L 9/0822
See application file for complete search history.

(56) References Cited

U.S. PATENT DOCUMENTS

2005/0210467 A1* 9/2005 Zimmer .............. G06F 9/45558
718/1
2010/0058042 A1* 3/2010 Locker .................. G06F 9/4416
718/1
(Continued)

OTHER PUBLICATIONS

"TCG Storage, Enterprise SSC Feature Set: PSK Secure Messaging", Specification Version 1.00, Revision 1.00, Aug. 5, 2015, 19 pages, Trusted Computing Group, Inc.
(Continued)

*Primary Examiner* — Michael Krofcheck
(74) *Attorney, Agent, or Firm* — Trop, Pruner & Hu, P.C.

(57) ABSTRACT

A self-encrypting drive (SED) comprises an SED controller and a nonvolatile storage medium (NVSM) responsive to the SED controller. The SED controller enables the SED to perform operations comprising: (a) receiving an encrypted media encryption key (eMEK) for a client; (b) decrypting the eMEK into an unencrypted media encryption key (MEK); (c) receiving a write request from the client, wherein the write request includes data to be stored and a key tag value associated with the MEK; (d) using the key tag value to select the MEK for the write request; (e) using the MEK for the write request to encrypt the data from the client; and (f) storing the encrypted data in a region of the NVSM allocated to the client. Other embodiments are described and claimed.

18 Claims, 7 Drawing Sheets

(51) Int. Cl.
G06F 12/02 (2006.01)
H04L 9/08 (2006.01)
(52) U.S. Cl.
CPC ........ G06F 3/0679 (2013.01); G06F 12/1466 (2013.01); H04L 9/0822 (2013.01); G06F 12/0238 (2013.01)

(56) References Cited

U.S. PATENT DOCUMENTS

| | | | | |
|---|---|---|---|---|
| 2010/0086133 A1* | 4/2010 | Asano | ................... | H04L 9/0822 380/255 |
| 2015/0067349 A1* | 3/2015 | Werner | ................. | H04L 9/0877 713/189 |
| 2015/0242640 A1* | 8/2015 | Obukhov | .............. | G06F 21/602 713/193 |
| 2017/0039397 A1* | 2/2017 | Furuhashi | ............... | G06F 21/62 |

OTHER PUBLICATIONS

Dworkin, "Recommendation for Block Cipher Modes of Operation: Methods for Key Wrapping", NIST Special Publication 800-38F, Dec. 2012, 32 pages, National Institute of Standards and Technology, U.S. Department of Commerce.

"Implementation Guidance for FIPS 140-2 and the Cryptographic Module Validation Program", Feb. 5, 2019, 240 pages, National Institute of Standards and Technology, Canadian Centre for Cyber Security.

"TCG Storage Architecture Core Specification", Specification Version 2.01, Revision 1.00, Aug. 5, 2015, 306 pages, Trusted Computing Group, Inc.

"TCG Storage Security Subsystem Class: Enterprise", Specification Version 1.0, Revision 1.0, Jan. 27, 2009, 133 pages, Trusted Computing Group, Inc.

"Security Requirements for Cryptographic Modules", FIPS Pub 140-2 (Federal Information Processing Standards Publication), May 25, 2001, 69 pages, National Institute of Standards and Technology, U.S Department of Commerce.

"Hardware-based full disk encryption", Wikipedia, Feb. 9, 2018, four pages.

"ATA Security Feature Set Guide, With introduction to TCG Opal and SEDs with AES 256 Encryption", 2018, nine pages, BiTMICRO Networks, Inc.

"Information technology—ATA/ATAPI Command Set-2 (ACS-2)", Project T13/2015-D, Revision 7, Jun. 22, 2011, 553 pages, Working Draft ATA/ATAPI Command Set—2 (ACS-2).

"Key Management Interoperability Protocol (KMIP)"; Wikipedia, Feb. 11, 2019, five pages.

"Key Management Interoperability Protocol Specification Version 1.4", Nov. 22, 2017, 242 pages, OASIS Standard.

Rudoff, "Intel® Optane™ DC Persistent Memory: A Major Advance in Memory and Storage Architecture", Nov. 1, 2018, updated Jan. 8, 2019, 11 pages.

"Information technology—SCSI Primary Commands—4 (SPC-4)"; Project T10/1731-D, Revision 31; Jun. 13, 2011, 859 pages.

"NVM Express"; Revision 1.3; May 1, 2017, 282 pages, NVM Express, Inc.

"Seagate Secure® TCG Opal SSC Self-Encrypting Drive, FIPS 140-2 Module Security Policy, Security Level 2", Rev. 2.0, Aug. 20, 2014; 20 pages, Seagate Technology, LLC.

"NVM Express Base Specification, Revision 1.3d", Mar. 20, 2019, 282 pages, NVM Express, Inc.

"TCG Storage, Security Subsystem Class: Opalite, Specification Version 1.00 Revision 1.00", Aug. 5, 2015, Trusted Computing Group, Inc.

"TCG Storage, Opal SSC Feature Set: PSK Secure Messaging, Specification Version 1.00 Revision 1.00", Aug. 5, 2015, Trusted Computing Group, Inc.

"TCG Storage, Core Spec Addendum: Secure Messaging, Specification Version 1.00 Revision 1.00", Aug. 5, 2015, Trusted Computing Group, Inc.

"TCG Storage, Security Subsystem Class: Opal, Specification Version 2.01 Revision 1.00", Aug. 5, 2015, Trusted Computing Group, Inc.

"IEEE P1619™/D16, Standard for Cryptographic Protection of Data on Block-Oriented Storage Devices", 2007, Institute of Electrical and Electronics Engineers, Inc.

"Federal Information Processing Standards Publication 197, Announcing the Advanced Encryption Standard (AES)", Nov. 26, 2001, National Institute of Standards and Technology (NIST).

* cited by examiner

TECHNOLOGY FOR FINE-GRAIN ENCRYPTION AND SECURE KEY INJECTION ON SELF-ENCRYPTING DRIVES

This application claims priority to U.S. provisional patent application Ser. No. 62/668,844, filed May 9, 2018, the content of which is hereby incorporated by reference.

TECHNICAL FIELD

The present disclosure pertains in general to data processing systems and in particular to technology for self-encrypting drives.

BACKGROUND

Current self-encrypting drive (SED) security management interfaces include the AT attachment (ATA) Security interface, the Trusted Computing Group (TCG) Enterprise Security Subsystem Class (SSC) interface, and the TCG Opal SSC interface. One or more of those interfaces provide mechanisms for managing the following processes:
1. Internally generating a media encryption key (MEK) within the storage device for encrypting a particular contiguous region of storage within the storage device;
2. Associating a password with the generated MEK;
3. Using the password as an access control mechanism to protect:
   a. the ability to change access control settings (i.e., settings to lock or unlock the storage device or the region);
   b. the ability to access the region (i.e., the ability to read and decrypt data from the region, and the ability to encrypt and write data to the region);
   c. the ability to cryptographically "erase" the data in the region by changing the MEK for that region (e.g., by zeroing out the MEK); and
   d. the ability to change the configuration of the region (e.g., the size of the region or the start address of the region).

Also, some storage devices provided by Intel Corporation (a) combine the password that is associated with the MEK with other unique per-drive material or data to form a key encryption key (KEK) and (b) use that KEK to wrap and unwrap the MEK.

However, the security management interface for a conventional SED presents limitations which make it difficult or impossible for a datacenter to effectively utilize conventional SEDs in storage appliances intended to provide encrypted virtual storage for clients of the datacenter.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
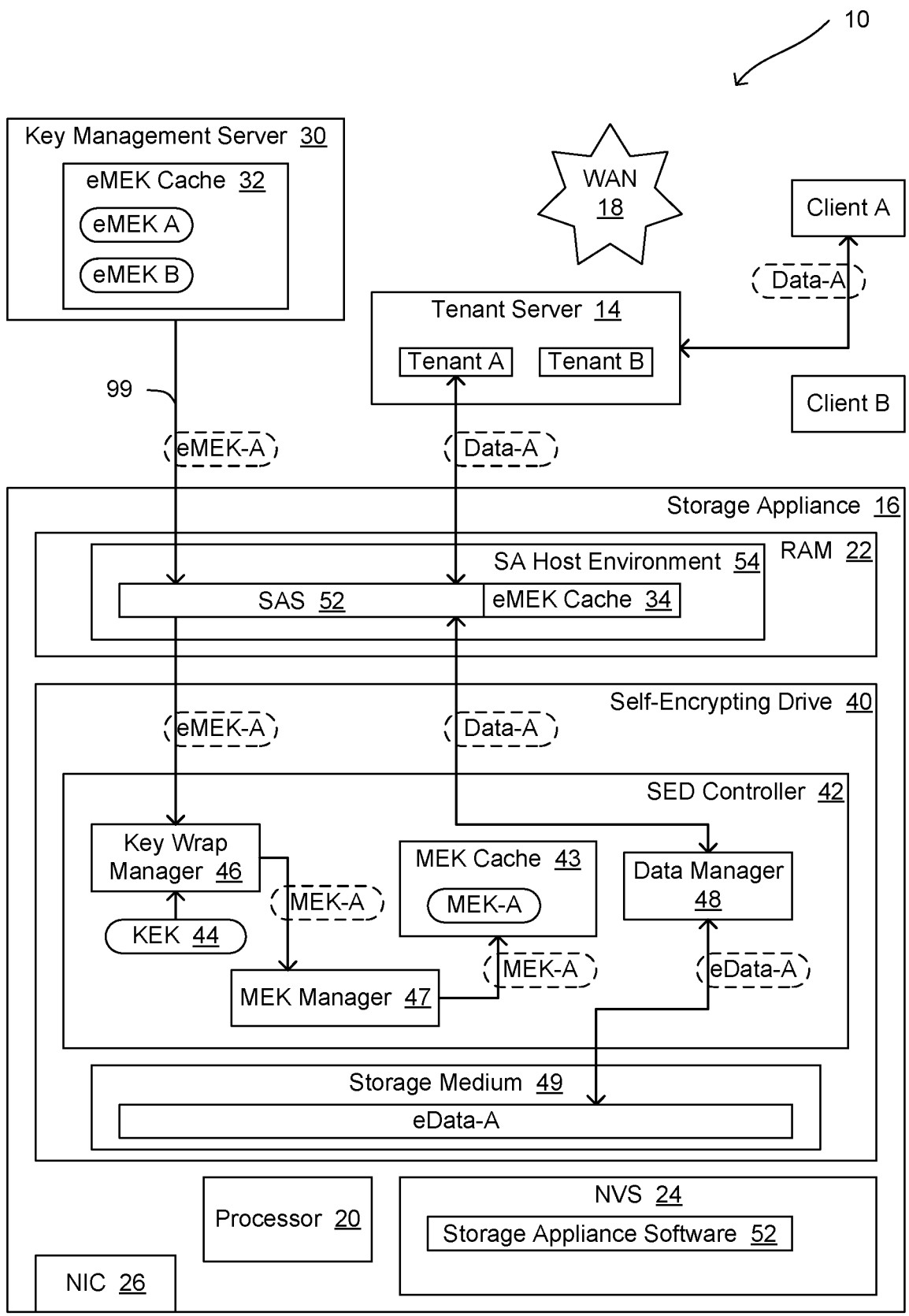
FIG. 1 is a block diagram of an example embodiment of a distributed data processing system with technology for fine-grain encryption and secure key injection on an SED.

A datacenter may use one or more storage appliances to provide storage for remote clients, and each storage appliance may include one or more storage devices. For a client using the storage, even though the storage is not local, at least some of the software on the client may be able to access data from the storage as if the storage were local to the client. The storage may therefore be referred to as virtual storage, cloud storage, network-attached storage (NAS), etc. If a client has an account with a datacenter to enable that client to use remote storage from that datacenter, the client may be referred to as a tenant.

As indicated above, the security management interface for a conventional SED presents limitations which make it difficult or impossible for a datacenter to effectively utilize conventional SEDs in storage appliances intended to provide for encrypted virtual storage. For instance, the data center may require its storage appliances to follow the specification from the National Institute of Standards and Technology (NIST) entitled "Implementation Guidance for FIPS 140-2 and the Cryptographic Module Validation Program" ("IG for FIPS 140-2"), and that specification provides for establishment of keys using "electronic distribution" and "electronic entry." However, the password-based interface used to unlock a conventional SED is not compatible with "electronic distribution" and "electronic entry."

Another important limitation is that the granularity of encryption for a conventional SED may be too large and inflexible to be effectively used to encrypt and/or erase dynamically-sized storage for a particular tenant. For instance, it may be possible to configure a conventional SED with multiple locking ranges (e.g., a first contiguous locking range and a second contiguous locking range) at initialization time. However, a conventional SED may lack suitable features for subsequently changing the locking ranges. To modify a conventional SED to provide such features might require adding components to the SED such as additional hardware, complex mapping tables, etc. In addition, a conventional SED relies on credentials such as passwords to unlock access to the stored data, and the SED generates and stores the encryption key(s) which protect the stored data.

Also, techniques for using pre-shared keys (PSKs) to establish session keys are described in the specification from the Trusted Computing Group, Incorporated (TCG) entitled "TCG Storage, Enterprise SSC Feature Set: PSK Secure Messaging," Specification Version 1.00, Revision 1.00, dated Aug. 5, 2015. For instance, that specification discusses the transport layer security (TLS) pre-shared key (PSK) (TLS-PSK) protocol for establishing a session key and passing information to a storage device through a secure tunnel.

In addition, a conventional data processing system may use nonvolatile memory (NVM) to store data. That NVM may be also referred to as persistent memory. For instance, a conventional data processing system may include a solid-state drive (SSD) that uses persistent memory as the storage medium. Persistent memory such as that provided by Intel Corporation under the name or trademark of Intel® Optane™ memory and/or 3D XPoint™ may feature very low latency and high bandwidth.

Another potential technique for providing fine-grain encryption for storage involves software-based encryption, with a layer of encryption software used between the tenant and the storage device. However, software-based encryption involves various disadvantages, including significant latency penalties, particularly when used in conjunction with storage media that has very low latency and high bandwidth.

As described in greater detail below, the present disclosure introduces technology for fine-grain encryption and secure key injection on self-encrypting drives which reduces or eliminates some or all of the limitations and disadvantages addressed above. In particular, in at least one embodiment, the technology of the present disclosure provides for the following functionality:

1. MEKs are directly injected into a SED, while the MEKs are protected using a key management protocol such as version 1.4 of the Key Management Interoperability Protocol (KMIP), which is described in the specification from the Organization for the Advancement of Structured Information Standards (OASIS) entitled "Key Management Interoperability Protocol Specification" (the "KMIP specification"). Thus, the MEKs for an SED may be maintained and cached external to the SED.
2. A storage appliance uses software-based mapping of input/output (I/O) to injected keys through the use of key tags in the I/O commands, thereby enabling fine-grain encryption.
3. An SED uses hardware-based storage of a unique identifier (ID) which is used to verify that the MEK being used to access the data is the correct key, thereby enabling the SED to distinguish between (a) errors due to incorrect keys and (b) true bit errors for uncorrectable bit-error rate (LIBER) metrics.

These features address the challenges with FIPS certification and encryption granularity mentioned above.

For example, in one embodiment, the technology described herein provides (a) for secure key injection into an SED implemented as an SSD and (b) for fine grain encryption that is handled by the SSD. Accordingly, the SSD may still retain the low latency and high bandwidth performance of a modern SSD. In addition, the technology described herein enables a storage appliance to virtualize multiple logical volumes through injection and caching of multiple corresponding MEKs.

As described in greater detail below, an SED may perform certain operations according to Advanced Encryption Standard (AES) specifications. For instance, the SED may perform key wrap (KW) operations according to AES-KW, and the SED may perform payload encryption operations according to an XOR-encrypt-XOR (XEX) specification such as the so-called "XEX-based tweaked-codebook mode with ciphertext stealing" (XTS) specification, also known as AES-XTS.

FIG. 1 is a block diagram of an example embodiment of a distributed data processing system 10 with technology for fine-grain encryption and secure key injection on an SED 40. In the illustrated embodiment, distributed data processing system 10 includes clients A and B which connect to a tenant server 14 via a wide area network (WAN) 18. Distributed data processing system 10 also includes a storage appliance (SA) 16 and a key management server (KMS) 30. Tenant server 14 may connect to SA 16, and SA 16 may connect to KMS 30 via any suitable connection (e.g., via a local area network (LAN), a WAN, or any suitable combination of LANs and WANs). Similarly, in another embodiment, the clients may connect with the tenant server via any suitable type of network or combination of networks. In the embodiment of FIG. 1, components such as tenant server 14 and SA 16 may be referred to collectively as a remote storage facility or a cloud storage facility. A remote storage facility may also include other components, such as KMS 30. In the embodiment of FIG. 1, two or more components of the remote storage facility are implemented as distinct data processing systems. In other embodiments of a remote storage facility, some or all components may reside a single data processing system.

In the embodiment of FIG. 1, SA 16 includes various hardware and software processing resources, including at least one processor 20, random access memory (RAM) 22, nonvolatile storage (NVS) 24, and at least one SED 40. Processor 20 may copy storage appliance software (SAS) 52 from NVS 24 to RAM 22 for execution, and processor 20 may then execute SAS 52, thereby creating an SA host environment 54. As described in greater detail below, tenant server 14 may then access SED 40 for clients via SA host environment 54. In addition, as described in greater detail below, SA host environment 54 may obtain key management services for clients from KMS 30.

NVS 24 may be implemented using any suitable nonvolatile storage technology (e.g., magnetic disk, NVM, etc.). In the embodiment of FIG. 1, NVS 24 is distinct from the nonvolatile storage medium 49 of SED 40. For instance, NVS 24 and storage medium 49 may be in separate drives. However, in another embodiment, a storage appliance may use the same nonvolatile storage medium to store the SAS and to store the encrypted client data. In other words, the nonvolatile storage that contains the SAS may be part of the NVSM responsive to the SED controller;

Like SA 16, other individual data processing systems such as clients, tenant servers, and KMSs may each include its own set of processing resources (e.g., one or more processors, RAM, NVS, software, etc.) Also, in another embodiment, a tenant server may connect to multiple SAs which cooperate to provide remote storage for clients. Alternatively, in another embodiment, a single system may perform the services of a tenant server and an SA. In other words, the tenant server and the SA may be merged into a single system. In another embodiment, the KMS may also be merged into such a single system.

In the embodiment of FIG. 1, SED 40 includes an SED controller 42 and nonvolatile storage medium 49. Storage medium 49 may be implemented using any suitable nonvolatile storage technology (e.g., magnetic disk, NVM, etc.). SED controller 42 includes control logic for self-encryption, including a key wrap manager 46, a MEK manager 47, and a data manager 48. SED controller 42 also includes a KEK 44, and a volatile MEK cache 43. As described in greater detail below, key wrap manager 46 uses KEK 44 to unwrap or decrypt an encrypted MEK (eMEK) for a tenant into a MEK. MEK manager 47 then saves the (decrypted) MEK to MEK cache 43. And data manager 48 subsequently uses the cached MEK to (a) encrypt (plaintext) data to be written to storage medium 49 for that tenant and/or (b) to decrypt (encrypted) data that is read from storage medium 49 for that tenant.

Such operations are illustrated by some of the arrows and by the ovals with dotted outlines in FIG. 1. For instance, data belonging to client A (or "tenant A") is illustrated as "Data- A," and that data passes between client A and data manager 48 via tenant server 14 and SA host environment 54. Data-A may be plaintext. Also, as described in greater detail below, SAS 52 in SA host environment 54 obtains the eMEK for tenant A (eMEK-A) from KMS 30, and SAS 52 provides eMEK-A to SED controller 42. Key wrap manager 46 then uses KEK 44 to decrypt eMEK-A into MEK-A. MEK manager 47 then saves MEK-A to MEK cache 43. And data manager 48 then uses the cached MEK-A to (a) encrypt Data-A into eData-A, to be written to storage medium 49 and/or (b) to decrypt eData-A into Data-A in conjunction with reading eData-A from storage medium 49 for tenant A.

SED controller 42 may keep the MEK for each client in MEK cache 43 while that client is connected to SA 16 via tenant server 14. However, MEK cache 43 is volatile storage. Therefore, the MEKs are lost whenever SED controller 42 loses power. In other words, SED controller 42 uses volatile storage (and only volatile storage) to store MEKs, so that no unencrypted MEKs are stored in SED 40 when the power is off.

In addition, in the embodiment of FIG. 1, KMS 30 includes an eMEK table 32 which contains the eMEKs for the tenants with registered accounts on tenant server 14. Those eMEKs are versions of MEKs that have been wrapped or encrypted using KEK 44. KMS 30 and SA 16 use any suitable protocol to establish KEK 44.

Thus, as described in greater detail below, SA 16 may use SED 40 to store encrypted data for multiple different tenants, using a different MEK for each of those tenants. In addition, SA 16 may dynamically change the amount of encrypted space used by each tenant.

For purposes of this disclosure, a region is a set of contiguous storage locations. SED 40 may use various different types of regions. For instance, in one embodiment, when SED controller 42 reads from or writes to storage medium 49, it reads or writes one or more blocks at a time, with each block containing 128 contiguous pages, each page containing 8 contiguous sectors, and each sector containing about 512 bytes, so that one page contains about 4 kilobytes (K) of storage, and one block contains about 512K (where 1K equals 1024 bytes). For instance, in one embodiment, a sector contains 512 bytes of data, plus additional metadata bytes for storage of other information needed by the SED controller. For example, the metadata may include information such as a fragment of a key index that is spread across the metadata fields of a certain number of sectors. A page may also be referred to as a codeword. However, in other embodiments, SEDs may use sectors, pages, and/or blocks with different sizes.

Also, SAS 52 may define a logical volume for each tenant, with that logical volume containing each of the blocks belonging to that tenant. However, the blocks in a logical volume need not be contiguous with each other. In other words, a logical volume is a collection of blocks, which need not be contiguous.

Figure 2:
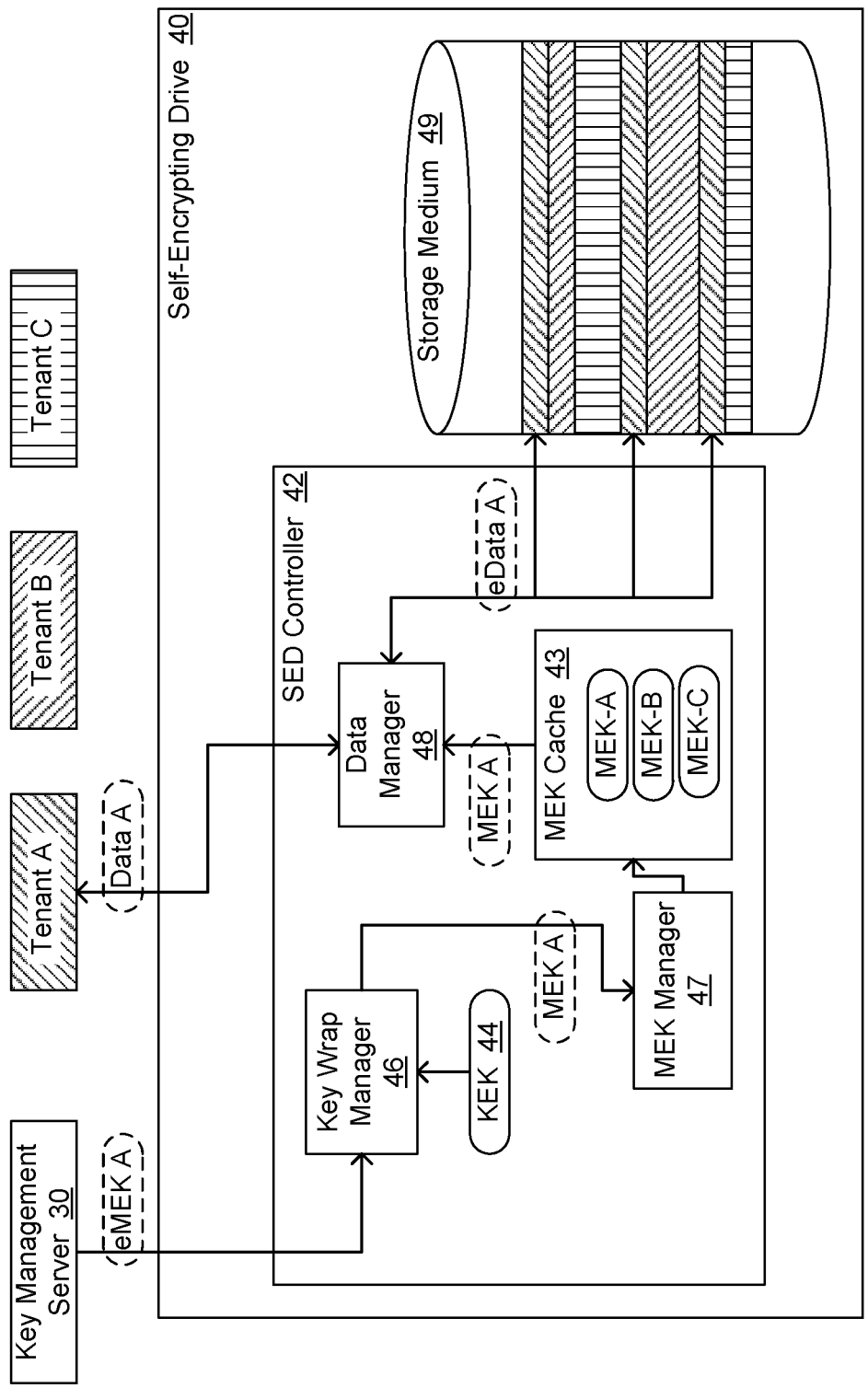
FIG. 2 is block diagram illustrating, at a high level, an example embodiment of a process for direct injection of MEKs.
Figure 3:
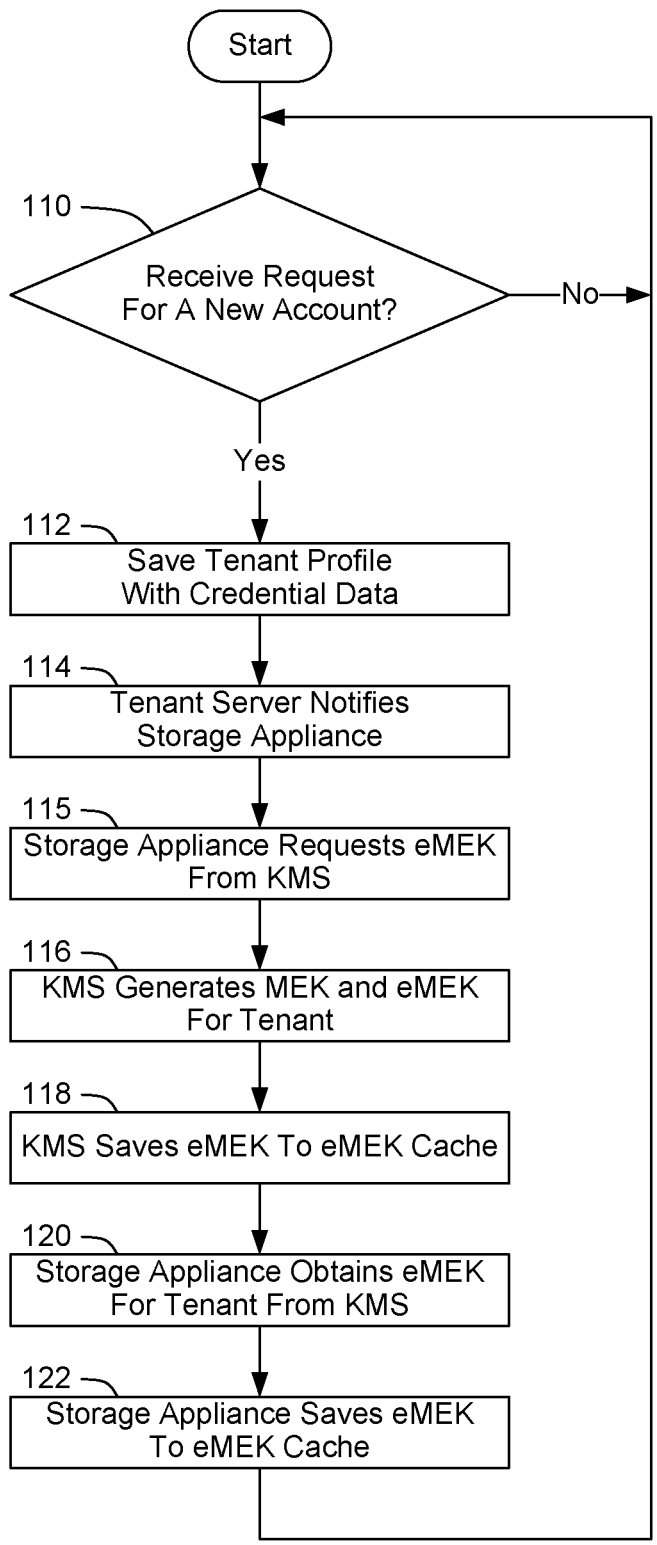
FIG. 3 is a flowchart of an example embodiment of a process for assigning a MEK to a tenant.
Figure 4:
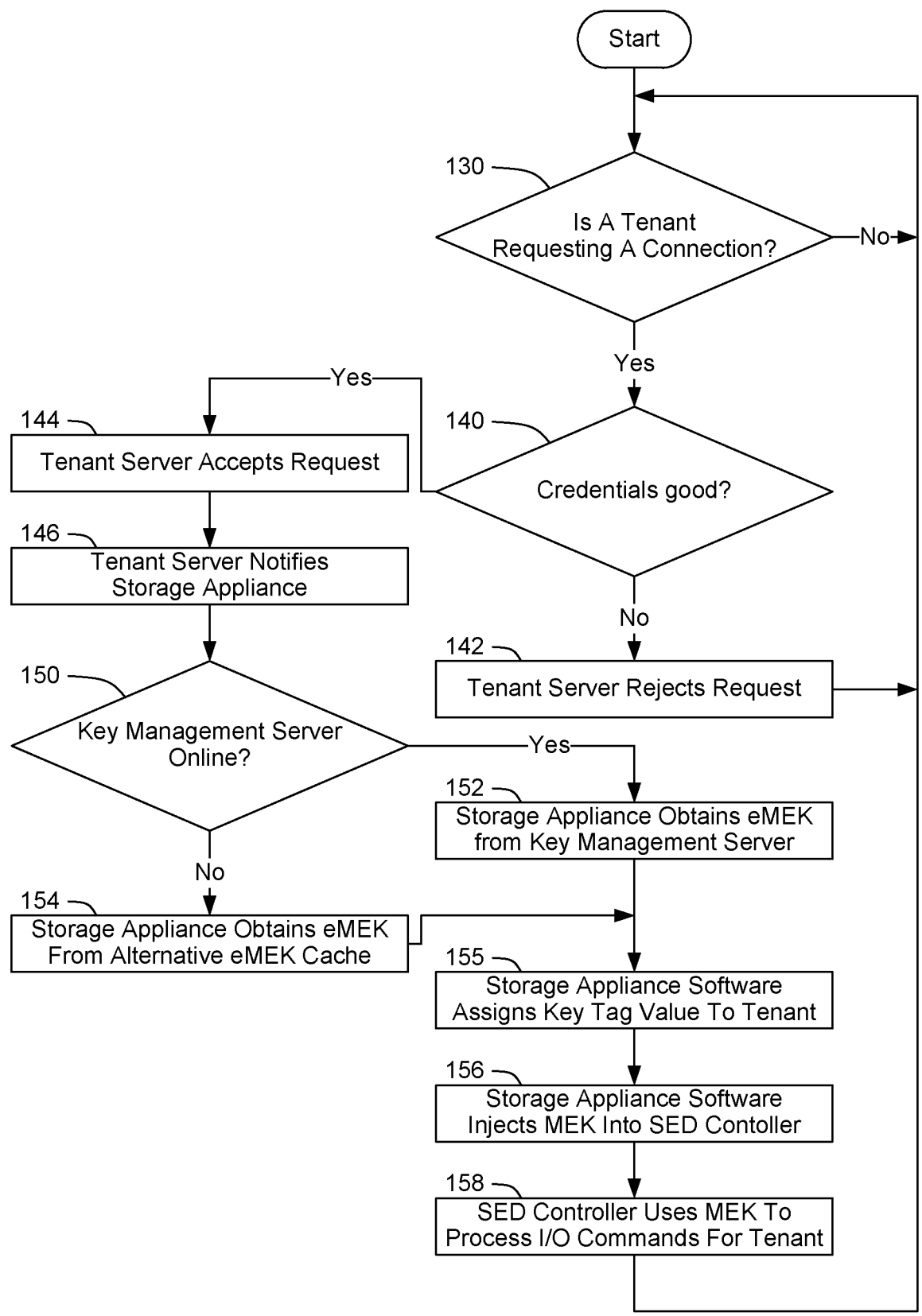
FIG. 4 is a flowchart of an example embodiment of a process for directly injecting a MEK into an SED and using the MEK to access data in the SED for a tenant.

FIG. 2 is block diagram illustrating, at a high level, an example embodiment of a process for direct injection of MEKs and for utilizing MEKs for input/output. The process of FIG. 2 may be performed by distributed data processing system 10. However, some components and details are omitted, to provide a broad overview of the process. In case of conflict between FIG. 2 and FIG. 1, FIG. 1 should be understood as more definitive. In addition, FIGS. 3 and 4 provide additional pertinent details.

In the embodiment of FIG. 2, tenants A, B, and C have registered with tenant server 14. KMS 30 has subsequently provided SA 16 with eMEKs for each of those tenants (i.e., eMEK-A, eMEK-B, and eMEK-C, respectively). Also, SED controller 42 has unwrapped those eMEKs and cached the resulting MEKs (i.e., MEK-A, MEK-B, and MEK-C, respectively) in MEK cache 43. For example, FIG. 2 illustrates that SED 40 has obtained eMEK-A from KMS 30, key wrap manager 46 has used KEK 44 to decrypt eMEK-A into MEK-A, and MEK manager 47 has saved MEK-A in MEK cache 43.

In particular, SAS 52 and KMS 30 securely inject the MEKs into SED 40 using a key wrapping mechanism or protocol that protects the MEKs from the time of egress from KMS 30 to the time of eMEK decryption by SED controller 42. In one embodiment, the key wrapping mechanism may involve KMS 30 applying the AES-KW algorithm to each MEK to generate an eMEK, and SED controller 42 applying the AES-KW algorithm to decrypt each eMEK back into a MEK. For instance, KMS 30 and SED 40 may follow the specification from the NIST entitled "Recommendation for Block Cipher Modes of Operation: Methods for Key Wrapping," also known as (AKA) "NIST Special Publication 800-38F" from December 2012. For instance, SED 40 may be configured with the KEK or "wrapping key" before receiving eMEKs from KMS 30. The mechanism for KEK establishment may involve a plaintext, first-come first-served protocol; KEK 44 may be pre-provisioned in SED 40; or any other suitable technique may be used to provision SED 40 with KEK 44.

Also, in the embodiment of FIG. 2, SED 40 has used the MEK for each tenant to encrypt data from that tenant, and SED 40 has written that encrypted data to storage medium 49. For instance, data manager 48 has used MEK-A to encrypt Data-A into eData-A, and data manager 49 has written eData-A to storage medium 49. Data manager 48 may subsequently uses MEK-A to decrypt eData-A into Data-A in conjunction with reading eData-A from storage medium 49 for tenant A. In particular, SED 40 uses MEK-A to perform encryption and decryption of tenant data at the I/O level.

FIG. 2 also illustrates that SED 40 has used multiple different blocks of storage for each tenant in storage medium 49, that the different blocks for an individual tenant need not be contiguous with each other, and that the different blocks may have different sizes. FIG. 2 uses different types of fill to denote the storage blocks for the different tenants, with upward diagonals or "up slashes" (i.e., diagonal lines going up to the right) denoting blocks for tenant A, downward diagonals or "down slashes" denoting blocks for tenant B, and vertical lines denoting blocks for tenant C.

In one embodiment, SAS 52 operates as layer between the tenant and SED 40, with SAS 52 mapping the tenant access to a particular set of regions/blocks within storage medium 49. Moreover, SAS 52 may dynamically modify the block structure for each tenant as necessary (e.g., increasing the size of a tenant's block, removing a tenant's block, adding a non-contiguous additional block for a tenant that already has one or more blocks in SED 40, etc.). For instance, SAS 52 may dynamically allocate a first region of storage medium 49 to the tenant at one time and then dynamically allocate a second region to the tenant at a later time (e.g., in response to the tenant needing more space for secure storage). Furthermore, the first and second regions may not be contiguous. Nevertheless, SED 40 may utilize the MEK for the client in conjunction with accessing the first region and in conjunction with accessing the second region.

FIG. 3 is a flowchart of an example embodiment of a process for assigning a MEK to a tenant in distributed data processing system 10. That process starts with tenant server 14 determining whether it has received a registration request from a client for a new account to use remote storage. If tenant server 14 has received such a request, and if tenant server 14 determines that the request should be approved, tenant server 14 may save a tenant profile for the client, as shown at block 112. For instance, the tenant profile may include credential data (e.g., a password, biometric data, etc.) to be used to authenticate the client whenever the client attempts to connect to tenant server 14.

As shown at block 114, tenant server 14 then notifies SAS 52 in SA 16 about the new client or tenant. In response, SAS 52 requests an eMEK for the new tenant from KMS 30, as shown at block 115. Consequently, as shown at block 116, KMS 30 generates a MEK for the tenant, and KMS 30 uses KEK 44 to encrypt that MEK into an eMEK. As shown at block 116, KMS 30 may then save the eMEK to eMEK table 32, to enable KMS 30 to provide the same eMEK for the tenant to SAS 52 whenever SA 16 subsequently requests the eMEK from tenant server 14 (e.g., in response to the tenant subsequently reconnecting to SA 16).

As shown at block 120, KMS 30 then sends the eMEK for the new tenant to SAS 52 in SA 16. As shown at block 122, SAS 52 then saves a copy of the eMEK in an eMEK cache 34 that resides in SA host environment 54 in RAM 22 (which is volatile storage). Since eMEK cache 34 is maintained by SAS 52, eMEK cache 34 may also be referred to as a software key cache. As described in greater detail below, SAS 52 may subsequently retrieve the eMEK for the tenant from eMEK cache 34 or from KMS 30 (e.g., in response to the tenant subsequently reconnecting to SA 16). For instance, if KMS 30 is online when SAS 52 needs an eMEK for a tenant, SAS 52 may obtain the eMEK for the tenant from KMS 30. And as described in greater detail below with regard to FIG. 4, if KMS 30 is offline, SAS 52 may wait for KMS 30 to come back online, or SAS 52 may obtain the eMEK from an alternative source. For instance, if KMS 30 is offline but the eMEK for the tenant is still in eMEK cache 34 in RAM 22, SAS 52 may retrieve the eMEK for the tenant from eMEK cache 34.

In another embodiment or scenario, the SAS does not create or use an eMEK cache, and if the primary KMS is offline when a tenant tries to connect to the SA, the SAS may wait for that KMS to come back online, or the SAS may obtain the eMEK for the tenant from a secondary KMS. In another embodiment, the KMS sends the eMEK for the tenant to the tenant, and the tenant then saves that eMEK in an eMEK cache within virtual machine software of the tenant. The tenant may then supply the SA with that eMEK whenever the tenant connects to the SA.

The process of FIG. 3 may then return to block 110, with tenant server 14 waiting for the next request for a new account. Tenant server 14 may also wait for a request from a tenant or client to connect to SA 16, as described in greater detail below with regard to FIG. 4.

FIG. 4 is a flowchart of an example embodiment of a process for directly injecting a MEK into SED 40 and using the MEK to access data in SED 40 for a tenant. Distributed data processing system 10 may use the process of FIG. 4 after a client has registered with tenant server 14, as described above. As shown at block 130, the process of FIG. 4 may start with tenant server 14 determining whether a registered client or tenant is attempting to establish a connection with SA 18 to utilize remote storage services. As shown at block 140, if a client is trying to connect, tenant server 14 examines credentials from the client (e.g., a password, etc.) to determine whether the client is authentic. If the credentials are not good, tenant server 14 rejects the request, as shown at block 142, and the process may return to block 130 with tenant server 14 waiting for the next request for a connection.

As shown at blocks 144 and 146, if the credentials are good, tenant server 14 accepts the request and notifies SAS 52 in SA 16 that the client is trying to connect to SA 16. In response, as shown at block 150, SAS 52 may determine whether KMS 30 is online. If KMS 30 is online, SAS 52 may obtain the eMEK for the client from KMS 30, as shown at block 152. If KMS 30 is offline, SAS 52 may obtain the eMEK for the client from an alternative source (e.g., from eMEK cache 34, from a secondary KMS, or from an eMEK cache in the client), as shown at block 154. In addition or alternatively, if KMS 30 is offline, SAS 52 may wait for KMS 30 to come back online, to obtain the eMEK for the client from KMS 30. Alternatively, SAS 52 may try to retrieve the eMEK for the client from eMEK cache 34 first, and then from KMS 30 if eMEK cache 34 does not include a valid eMEK for the client.

In addition, as shown at block 155, whenever a client connects to SA 16, SAS 52 assigns a key tag value to that client, with each connected client getting a different key tag value.

As shown at block 156, SAS 52 then injects the MEK into SED controller 42 by passing the eMEK to SED 40 and causing key wrap manager 46 to decrypt the eMEK into the MEK, with key manager 47 then saving the MEK in MEK cache 43. As shown at block 158, SED controller 42 then uses the MEK to process I/O commands from the client. SED 40 may continue processing I/O commands for the client, and the process may also return to block 130, with tenant server 14 establishing connections for additional clients upon request.

Furthermore, when SAS 52 sends the eMEK for a client to SED 40, SAS 52 uses a command or protocol which also maps that eMEK to the key tag value that SAS 52 assigned to that client. SAS 52 then uses that key tag value in subsequent I/O requests for that client, to reference/identify the key to be used by SED controller 42 to process those I/O requests. For instance, SAS 52 may inject a MEK and map that MEK to a key tag value using a command known as key management command (KMC). That KMC may include the fields described in the tables below.

TABLE 1

KMC Submission Queue Entry:

| Byte | Description |
|---|---|
| 63:44 | Reserved |
| 43 | Security Protocol (SECP): Security Protocols supported by KMC are shown in Table 2 (Security Protocol Mapping). The SECP field specifies the security protocol as defined in a predetermined security protocol definition (SPD), as described in greater detail below. The controller shall fail the command with Invalid Parameter indicated if the KMC specifies a value for SECP that is classified as a reserved value in Table 2. |
| 42:41 | Security Provider (SP) Specific (SPSP): SP Specific fields supported by KMC are shown in Table 3 (SP Specific Mapping). The value of the SPSP field contains the "Security Protocol Specific" field as defined in the SPD. |
| 40 | Reserved |
| 39:24 | Data Pointer (DPTR): This field specifies the data used in this command. |
| 23:16 | Metadata Pointer (MPTR): Metadata is not supported by this command. |
| 15:08 | Reserved |
| 07:04 | Namespace Identifier (NSID): This field specifies the namespace ID that this command applies to. If the namespace |

TABLE 1-continued

KMC Submission Queue Entry:

| Byte | Description |
|---|---|
| | ID is not used for the command, then this field shall be cleared to 0h. If a command shall be applied to all namespaces accessible by this controller, then this field shall be set to FFFFFFFFh. |
| | Unless otherwise noted, specifying an inactive namespace ID in a command that uses the namespace ID shall cause the controller to abort the command with status Invalid Field in Command. Specifying an invalid namespace ID in a command that uses the namespace ID shall cause the controller to abort the command with status Invalid Namespace or Format. |
| 03:02 | Command Identifier (CID): To be determined (TBD) |
| 01 | Reserved |
| 00 | Opcode (OPC): TBD |

TABLE 2

KMC Security Protocol Mapping:

| Value | Description |
|---|---|
| 00-02 | Reserved |
| 03 | Key Management Protocol |
| 04-FF | Reserved |

TABLE 3

KMC SP Specific Mapping:

| Value | Description |
|---|---|
| 0000 | KMIP Key Injection |
| FFFE | Delete Single Key |
| FFFF | Delete All Keys |
| All Others | Reserved |

TABLE 4

KMC KMIP Key Injection Command:

| Byte | Description |
|---|---|
| 43 | Security Protocol (SECP): 03 |
| 42:41 | SP Specific (SPSP): 0000 |
| 40 | Reserved |

TABLE 5

KMC KMIP Key Injection Data Structure:

| Byte | Description |
|---|---|
| TBD | KMIP Protected Key Structure (KPKS): Field TBD, but shall contain the tag, type, length, value (TTLV) encoded data from the KMIP server/client output. |
| 15:02 | Reserved |
| 01:00 | Key Tag Value (KTGV): This field specifies the key tag value to map to the media encryption key passed into the KMIP Key Injection command. |

Tables 1-5 show the structure of an example KMC. This structure may enable SAS 52 to use a KMC to inject a key protected by an OASIS KMIP implementation into SED 40, and to map that key to a key tag value. For instance, SAS 52 may supply the eMEK for a client in the KPKS field of Table 5, and SAS 52 may specify the corresponding key tag value in the KTGV field (bytes 0-1) of Table 5.

Also, Table 1 refers to a predetermined SPD. In one embodiment, that SPD may follow the standards set forth in the document from the InterNational Committee for Information Technology Standards (INCITS) entitled "Information technology—SCSI Primary Commands-4 (SPC-4)" and dated Jun. 13, 2011. In particular, the SPD may identify security protocols according to SPC-4.

Support for additional key protection protocols beyond the KMIP protocol may be supported through the use of additional SP Specific Mappings as shown in Table 3. For instance, in one embodiment, an SA may use a trusted platform module (TPM) to cache eMEKs for clients, and one or more SP Specific Mappings may be used to specify TPM payload format for such eMEKs.

Figure 5:
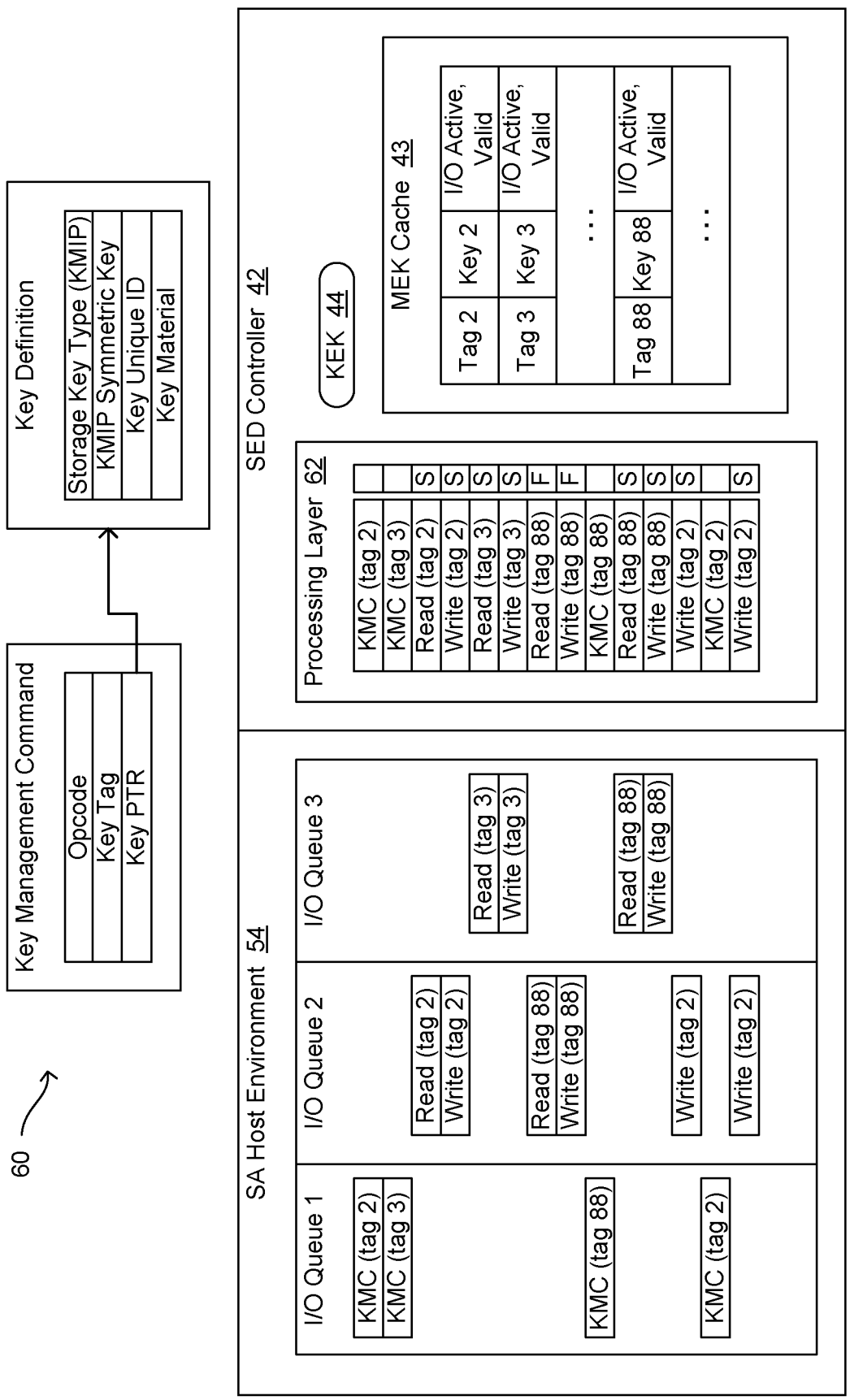
FIG. 5 is a block diagram illustrating various operations for direct injection of MEKs and for utilizing MEKs for input and output, according to an example embodiment.

FIG. 5 is a block diagram illustrating various operations for direct injection of MEKs and for utilizing MEKs for I/O, according to an example usage model. As described in greater detail below, FIG. 5 depicts a hypothetical scenario in which SAS 52 uses KMCs to insert MEKs and corresponding key tags into SED controller 42, and SAS 52 uses read/write commands/requests to access data protected by the MEKs. When an I/O request includes a valid key tag value, SED controller 42 automatically uses the corresponding MEK to encrypt or decrypt the data being written to or read from storage medium 49. FIG. 5 also shows examples of read/write requests attempting to use a key tag before the associated key has been inserted into SED controller 42, with SED controller 42 aborting those requests and returning errors.

In the hypothetical scenario of FIG. 5, SAS 52 is running in SA host environment 54, and SAS 52 has created various I/O submission queues in SA host environment 54 to handle commands/requests such as KMCs and I/O requests from tenant server 14 and from remote clients such as client A and client B. Those I/O submission queues are depicted as I/O Queues 1-3. In the illustrated scenario, SAS 52 generally uses I/O Queue 1 to handle KMCs, and SAS 52 uses each other I/O queue to handle I/O request from a different tenant, as described in greater detail below. However, in another embodiment or scenario, the SAS may insert KMCs into the same queue as I/O requests.

FIG. 5 also includes block diagrams of an example embodiment of a KMC data structure and a corresponding key definition data structure. Those two data structures may be referred to collectively as a KMC structure 60. And when an instance of KMC structure 60 has been populated with data, that instance may be referred to as a KMC. In the scenario of FIG. 5, each KMC for inserting a MEK points to a MEK key structure that is protected according to a predetermined standard (e.g., the KMIP specification).

In FIG. 5, KMC structure 60 includes fields for an operation code (opcode), for a key tag value, and for a pointer to the key definition data structure. The key definition data structure includes fields for a storage key type (e.g., type=KMIP), for a KMIP symmetric key, for a key unique ID, and for key material. However, FIG. 5 presents a high-level illustration of KMC structure 60 (e.g., depicting only a subset of the relevant fields). A lower level description with additional details is provided above with regard to Tables 1-5. In case of conflict between KMC structure 60 in FIG. 5 and the details provided by Tables 1-5, Tables 1-5 should be understood as more definitive. For instance, the Table 1 "data pointer" should point to the Table 5 "key injection data structure", out of which the KPKS field will contain the KMIP-formatted "Key Definition" payload which is shown in FIG. 5.

In the scenario of FIG. 5, SED controller 42 uses a processing layer 62 to process the requests from the I/O queues. In particular, SED controller 42 implements processing layer 62 largely according to Revision 1.3 of the "NVM Express" (NVMe) specification, dated May 1, 2017, from NVM Express, Inc, or from subsequent revisions, such as Revision 1.3d, dated Mar. 20, 2019. Accordingly, processing layer 62 may be referred to as an NVMe processing layer. However, processing layer 62 includes modifications (relative to revision 1.3d of the NVMe specification) to provide for the functionality described herein. Moreover, other embodiments may follow other specifications or protocols.

In one embodiment, data manager 48 and MEK manager 49 both operate within processing layer 62, with SED controller 42 using data manager 48 to handle read and write requests (I/O requests), and SED controller 42 using MEK manager 49 to handle KMCs. Also, key wrap manager 46 and MEK manager 47 are implemented as hardware and/or firmware within SED controller 42. Data manager 48 may also be implemented as hardware and/or firmware within SED controller 42. In one embodiment, MEK manager 47 uses direct memory access (DMA) to write specified tags to MEK cache 43. And when inserting a tag, MEK manager 47 may also insert the corresponding MEKs, as well as other data, such as (a) an "I/O active" flag to indicate whether the MEK is being used for a read or write command that is in progress, to ensure that the MEK isn't removed while that read/write is in progress; and (b) a "valid" flag to prevent the hardware from using a MEK that has not been marked valid by the SED controller firmware.

In FIG. 5, the I/O queues in SA host environment 54 include a sequence of blocks denoting different requests received by SAS 52, with those blocks/requests arranged vertically to reflect the order in which those requests were received. Also, data manager 48 in SED controller 42 includes a sequence of block pairs arranged vertically to reflect the order in which SED controller 42 processed those requests. The first block (or first column) in each pair (e.g., "KMC (tag 2)") indicates the type of request and the key tag value included in that request. And for read and write requests, the second block (or second column) indicates whether or not data manager 48 successfully completed the request, with the value S meaning the operation succeeded, and F meaning the operation failed.

In particular, the first request shown in SA host environment 54 is a KMC requesting insertion of a particular key (denoted in MEK cache 43 as "Key 2") with the key tag value of 2. SED controller 42 may use MEK manager 47 to process that request, with MEK manager 47 inserting that tag and associated key and other data into MEK cache 43.

In particular, the process for creating and absorbing a KMC may involve the following operations:
1. SA host software (e.g., SAS 52) inserts the KMC into an I/O queue.
2. MEK manager 47 validates that the specified key tag value is not currently in use by other I/O requests in process (e.g., based on the "I/O active" flag). If the specified key tag value is already being used, MEK manager 47 returns an error to SAS 52.
3. MEK manager 47 decrypts the eMEK into a MEK using the specified format or "key type." For instance, when the "storage key type" is KMIP, MEK manager 47 uses the KMIP key structure and the AES-KW algorithm with KEK 44. Thus, the AES-KW algorithm provides for confidentiality and authentication. If AES-KW authentication fails, MEK manager 47 returns an error to SAS 52.
4. MEK manager 47 then validates the parameters contained within the AES-KW encrypted payload. For instance, there may be a parameter specifying that the MEK is a KMIP data encryption key (DEK). In this case, MEK manager 47 will verify that the key is a proper "DEK." If parameter verification fails, MEK manager 47 returns an error to SAS 52.
5. MEK manager 47 inserts the decrypted/validated MEK into key cache 43 (which is implemented as hardware internal to SED controller 42) along with the specified key tag value. For instance, in one embodiment, key cache 43 is a table that is indexed by the key tag value, and MEK manager 47 writes the MEK into the entry or location within key cache 43 that corresponds to specified tag.

Consequently, MEK cache 43 associates each active key tag value with a corresponding MEK.

The second request in SA host environment 54 is a KMC requesting insertion of key with the key tag value of 3. In response, MEK manager 47 may also insert that tag and associated data (e.g., "Key 3") into MEK cache 43.

The third and fourth requests are read and write requests which specify the key tag value of 2. As shown in SED controller 42, data manager 48 is able to successfully process those requests, since MEK cache 43 already includes an entry to link key tag 2 with the corresponding MEK. Similarly, data manager 48 is able to successfully process the fifth and sixth requests.

The seventh and eighth requests attempt to read and write using the key tag value of 88. However, no key had been inserted into MEK cache 43 for that tag yet. Consequently, data manager 48 is not able to successfully process those requests. SED controller 42 may therefore return an error or failure message to SAS 52, and SAS 52 may in turn send a failure message to the client which sent those requests.

However, the next request is a KMC to insert the key associated with tag 88, and MEK manager 47 successfully processes that request. Data manager 48 is then able to successfully process the next two requests, which involve reading and writing using the MEK associated with the tag value of 88. SED controller 42 may then process the three remaining requests as indicated above.

As indicated above, after SAS 52 successfully inserts a MEK and a corresponding key tag for a tenant into SED 40 using a KMC, SAS 52 may process I/O requests from that tenant by submitting those I/O request to SED 40, along with the key tag for that tenant. SED 40 may then use that key tag to select the proper MEK for processing those I/O requests.

Also, as indicated above, processing layer 62 in SED 40 generally follows the NVMe specification, but with modifications to support the functionality described herein. For instance, SAS 52 may specify the desired key tag value by using modified versions of so-called "NVMe directive" fields in read/write commands. Details of the structure for such a read/write command are provided in the tables below, which correspond to similar tables in the NVMe specification. In the tables below, underlined text and strickenthrough text are used to show changes, relative to version 1.3d of the NVMe specification.

TABLE 6

Read/Write Command Dword 12:

| Byte | Description |
|---|---|
| 31 | Limited Retry (LR): If set to '1', the controller should apply limited retry efforts. If cleared to '0', the controller should apply all available error recovery means to write the data to the NVM. |
| 30 | Force Unit Access (FUA): This field indicates that the data shall be written to nonvolatile media before indicating command completion. There is no implied ordering with other commands. |
| 29:26 | Protection Information Field (PRINFO): Specifies the protection information action and check field, as defined in FIG. 194 of the NVMe specification. |
| ~~25:16~~ 25:24 | Reserved |
| 23:20 | Directive Type (DTYPE1): Specifies the Directive Type associated with the Directive Specific 1 field (DSPEC1). |
| 19:16 | Directive Type (DTYPE2): Specifies the Directive Type associated with the Directive Specific 2 field (DSPEC2). |
| 15:00 | Number of Logical Blocks (NLB): This field indicates the number of logical blocks to be written. This is a 0's based value. |

TABLE 7

Read/Write Command Dword 13:

| Byte | Description |
|---|---|
| ~~31:08~~ 31:16 | Directive Specific (DSPEC1): Specifies the Directive Specific value associated with the Directive Type field (refer to the corresponding Directive Type below). |
| 15:00 | Directive Specific (DSPEC2): Specifies the Directive Specific value associated with the Directive Type field (refer to the corresponding Directive Type below). |

TABLE 8

Directive Type declaration:

| Directive Type Value | Directive Identifier Definition |
|---|---|
| 01h (Streams) | This value specifies the identifier of the stream associated with the data that is to be written. If Streams is not enabled, then a status of Directive Invalid Operation shall be returned. |
| 02h (Dataset Management) | This value notifies the controller to use the "Dataset Management" directive. |
| 03h (Key Tag) | This value notifies the controller that the Directive Specific (DSPEC1 or DSPEC2) field becomes a key tag used to notify the controller which internal key to use for encryption/decryption of data in the I/O. |
| All others | Reserved |

As shown in Tables 6-8, the mechanism for SAS 52 to request an I/O (read/write command) to use a specific MEK inside SED 40 may involve the use of directive fields. Specifically, SAS 52 may specify a directive type of "Key Tag" using the directive type value shown in Table 8, in either DTYPE1 or DTYPE2 in Dword 12 shown in Table 6, and SAS 52 may specify the actual key tag value in the corresponding DSPEC1 or DSPEC2 in Dword 13 shown in Table 7.

Also, SAS 52 determines which key tag value to insert, based on the identity of the client that submitted the I/O request. For instance, SAS 52 may maintain a table for all clients that are connected to SA 16, with data in the table indicating which key tag value belongs to which client.

If SED 40 contains a valid key in MEK cache 43 for the key tag specified via the directive fields, SED controller 42 will process the I/O using the selected key, marking the key as active until the command completes (e.g., using the "I/O active" flag).

In some cases, SAS might try to read data from an SED using a key (or key tag value) that is different from the key that was used to write the data. Also, the SED may provide end-to-end data protection by ensuring (to a certain degree of probability) that stored data has not been corrupted at any point during storage or retrieval. In order monitor such protection, an SED may compute a checksum on the plaintext of the data to be stored prior to encrypting the data, and the SED may append the checksum to the stored data. If the SED uses one key to write the data and a different key to read the data, the read will not be successful. For example, the SED will not be able to decrypt the data properly, and the data will not contain or produce the proper checksum. The SED might then assume that an internal failure (e.g., an uncorrectable bit error due to cosmic ray, etc.) has occurred when, in fact, the wrong key was used to read or write the data.

However, according to the present disclosure, in one embodiment, SED 40 uses a value known as a "unique ID" (UID) to determine the difference between (a) read/write failures due to bad keys and (b) read/write errors due to uncorrectable bit errors and the like. That UID may be referred to as a MEK UID. In one embodiment, the MEK UID is 64 bits long. As described in greater detail below, SED 40 may compute the MEK UID based on identifiers associated with the MEK, and SED 40 saves the MEK UID with the encrypted data.

Figure 6:
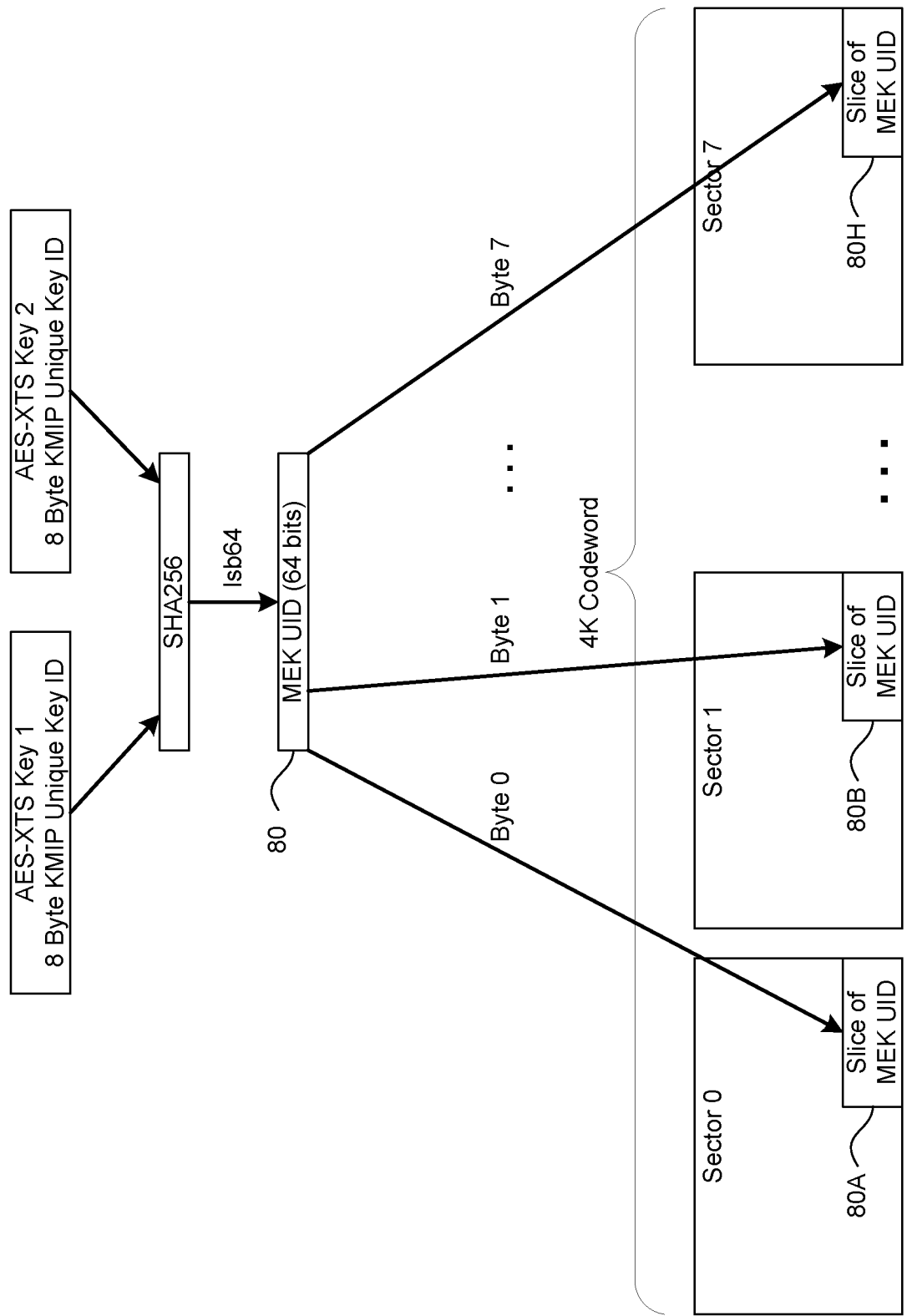
FIG. 6 is a block diagram illustrating an example embodiment of a process for generating a unique identifier and storing the unique identifier in a storage device.

FIG. 6 is a block diagram illustrating an example embodiment of a process for generating a MEK UID 80 and storing MEK UID 80 in SED 40. As illustrated, that process is associated with AES-XTS Key 1 and AES-XTS Key 2. In one embodiment, SED controller 42 uses the AES-XTS process to perform payload encryption operations. According to that process, payload encryption actually involves two keys: an AES-XTS Key 1 and an AES-XTS Key 2. In other words, a MEK (e.g., MEK-A) may consist of an AES-XTS Key 1 and an AES-XTS Key 2. For purposes of this disclosure, the AES-XTS Key 1 may be referred to as MEK-1, and the corresponding AES-XTS Key 2 may be referred to as MEK-2.

Also, according to the KMIP specification, each eMEK may include encrypted versions of the AES-XTS Key 1 and AES-XTS Key 2, along with a unique key ID for each of those keys. Those unique key IDs may be referred to as KMIP UID-1 and KMIP UID-2, respectively. In one embodiment, each KMIP UID is 8 bytes long.

As depicted in FIG. 6, SED controller 42 generates the MEK UID based on KMIP UID-1 and KMIP UID-2. In particular, SED controller 42 generates the 64-bit long MEK UID 80 by concatenating KMIP UID-1 and KMIP UID-2, hashing that result with a secure hash algorithm (SHA) such as SHA-256, using the 64 least significant bits (LSB) of that result as MEK UID 80.

In other words, SED controller 42 may generate MEK UID 80 according to the following formula:

$$\text{MEK UID} = \text{SHA256}(\text{KMIP UID-1} \| \text{KMIP UID-2})_{lsb\_64}$$

After generating MEK UID 80, SED controller 42 may store MEK UID 80 in the metadata area(s) of storage medium 49 by splitting MEK UID 80 into smaller pieces or slices (e.g., 1 byte per slice) and saving each slice in a different sector of storage medium 49. In particular, in the embodiment of FIG. 6, SED controller 42 reads and writes codewords to storage medium 49, with each codework covering about 4K. Also, each codeword includes 8 sectors, with each sector covering about 512 bytes. Accordingly, FIG. 6 shows MEK UID 80 split into 8 bytes (byte 0, byte 1, . . . , byte 7), with each slice (slice 80A, slice 80B, . . . , slice 80H) getting stored in a different sector (sector 0, sector 1, . . . , sector 7).

Figure 7:
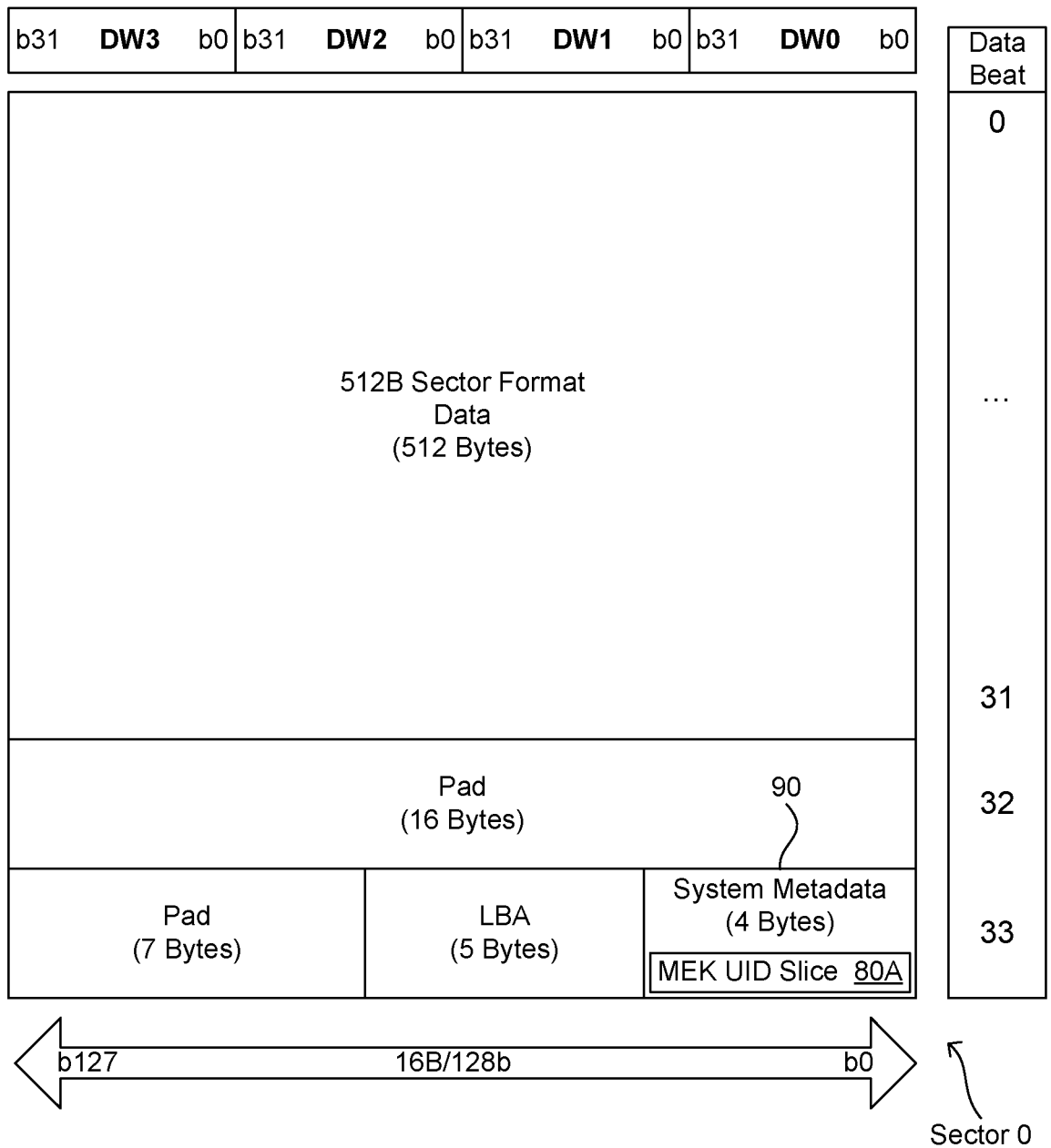
FIG. 7 is a block diagram illustrating an example sector from the storage device of FIG. 6 in greater detail.

FIG. 7 is a block diagram illustrating sector 0 from storage medium 49 in greater detail. In particular, FIG. 7 shows that SED controller 42 may store MEK UID slice 80A in a system metadata region 90 in sector 0. SED controller 42 may store each of the other MEK UID slices in the metadata region in one of the other sectors in the 4K codeword.

Thus, SED controller 42 stores the 64-bit MEK UID in the system metadata area of the storage device by striping 8-bit sections of the 64-bit MEK UID across multiple sectors in a 4K codeword. In one embodiment, there are 8 sectors in each codeword, and each sector receives 8 bits of the 64-bit MEK UID. Thus, together, those 8 sectors contain the overall 64-bit MEK UID. In one embodiment, the system metadata area includes 8 bits that are not used for any other type of metadata. Consequently, SED controller 42 is able to store the MEK UID in the metadata area without needing the size of the system metadata area to be increased.

As indicated above, in one embodiment, SAS 52 operates as layer between the tenant and SED 40, with SAS 52 performing operations such as mapping the tenant access to particular blocks, inserting key tag values into I/O requests, and dynamically modifying the blocks that are mapped to each tenant as necessary. In another embodiment, those kinds of operations may be performed by a hypervisor or virtual machine manager (VMM).

In some embodiments or scenarios, datacenters and cloud computing environments may use SEDs according to the present disclosure to provide virtualized storage that is secure and that can be dynamically customized according to changing needs. In other embodiments or scenarios, SEDs according to the present disclosure may be used in client computing environments to provide for encryption for particular files and folders.

Although certain example embodiments are described herein, one of ordinary skill in the art will understand that those example embodiments may easily be divided, combined, or otherwise altered to implement additional embodiments. Accordingly, the present teachings are not limited to the embodiments and/or scenarios described herein, but may be used to advantage in a wide variety of embodiment and scenarios.

In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from the principles described and/or illustrated herein.

Also, as described above, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Any suitable operating environment and programming language (or combination of operating environments and programming languages) may be used to implement software components described herein.

A medium which contains data and which allows another component to obtain that data may be referred to as a machine-accessible medium or a machine-readable medium. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices. Accordingly, alternative embodiments include machine-readable media containing instructions for performing the operations described herein. Such media may be referred to in general as apparatus and in particular as program products. Such media may include, without limitation, tangible non-transitory storage components such as magnetic disks, optical disks, dynamic RAM, static RAM, read-only memory (ROM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as microcode in an integrated circuit chip, as a programmable gate array (PGA), as an application-specific integrated circuit (ASIC), etc.).

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered. Embodiments of technology for managing memory tags include the following examples:

Example A1 is an SED suitable for use in a data processing system. The SED comprises an SED controller and a nonvolatile storage medium (NVSM) responsive to the SED controller. The SED controller enables the SED to perform operations comprising (a) receiving an eMEK for a client; (b) decrypting the eMEK into an unencrypted MEK for the client; (c) receiving a write request from the client, wherein the write request includes data to be stored and a key tag value associated with the MEK; (d) using the key tag value to select the MEK for the write request; (e) using the MEK for the write request to encrypt the data from the client; and (f) storing the encrypted data in a region of the NVSM allocated to the client.

Example A2 is a data processing system comprising a processor, nonvolatile storage responsive to the processor, SAS in the nonvolatile storage, and an SED according to Example A1 responsive to the processor. The SAS enables the processor to receive the write request from the client and, in response to the write request, (a) determine the key tag value for the client, (b) include the key tag value for the client in the write request, and (c) forward the write request to the SED. Also, the operation of receiving the write request from the client comprises receiving the write request from the client via the SAS.

Example A3 is an SED according to Example A1, wherein the operation of receiving the eMEK for the client comprises receiving the eMEK for the client from a key management server. Example A3 may also include the features of Example A2.

Example A4 is an SED according to Example A1, wherein the SED controller further enables the SED to respond to a read request for the region of the NVSM allocated to the client by determining, based on a key tag value in the read request, whether a MEK for the read request matches the MEK which was used to encrypt the data that was written to said region. Example A4 may also include the features of any one or more of Examples A2 through A3.

Example A5 is an SED according to Example A4, wherein the SED controller further enables the SED to store a UID for the MEK for the write request in the region of the NVSM allocated to the client, in connection with storing the encrypted data in said region. Also, the operation of determining whether the MEK for the read request matches the MEK which was used to encrypt the data that was written to said region comprises (a) using the key tag value in the read request to obtain a UID for the MEK for the read request; (b) reading the UID for the MEK for the write request from the NVSM; and (c) comparing the UID for the MEK for the read request with the UID for the MEK for the write request.

Example A6 is an SED according to Example A5, wherein the operation of storing the UID for the MEK for the write request in the region of the NVSM allocated to the client comprises (a) storing a first part of the UID in a first sector within the region of the NVSM allocated to the client; and (b) storing a second part of the UID in a second sector within the region of the NVSM allocated to the client.

Example A7 is an SED according to Example A5, wherein the MEK for the write request comprises a pair of AES-XTS keys according to an XEX-based tweaked-codebook mode with ciphertext stealing (XTS) process, involving XOR-encrypt-XOR (XEX) operations, according to an Advanced Encryption Standard (AES). Also, the SED controller enables to SED to generate the UID for the MEK for the write request based on the pair of AES-XTS keys. Example A7 may also include the features of Example A6.

Example A8 is an SED according to Example A1, wherein the region of the NVSM to hold the encrypted data comprises a first region of the NVSM. Also, the SED controller further enables the SED to (a) write encrypted data for the client to a second region of the NVSM, wherein the first and second regions are not contiguous; and (b) utilize the MEK for the client in conjunction with accessing the first region and in conjunction with accessing the second region. Example A8 may also include the features of any one or more of Examples A2 through A7.

Example A9 is an SED according to Example A1, further comprising volatile storage. Also, the SED is configured to save the unencrypted MEK only in the volatile storage. Example A9 may also include the features of any one or more of Examples A2 through A8.

Example B1 is a data processing system comprising a processor, nonvolatile storage responsive to the processor, SAS in the nonvolatile storage, and an SED responsive to the processor. The SED comprises an SED controller and an NVSM responsive to the SED controller. The SED controller enables the SED to perform operations comprising (a) receiving an eMEK for a client; (b) decrypting the eMEK into an unencrypted MEK for the client; (c) receiving a write request from the client via the SAS, wherein the write request includes data to be stored and a key tag value associated with the MEK; (d) using the key tag value to select the MEK for the write request; (e) using the MEK for the write request to encrypt the data from the client; and (f) storing the encrypted data in a region of the NVSM allocated to the client. Also, the SAS enables the processor to receive the write request from the client and, in response to the write request, (a) determine the key tag value for the client, (b) include the key tag value for the client in the write request, and (c) forward the write request to the SED.

Example B2 is a data processing system according to Example B1, wherein the NVSM responsive to the SED controller comprises the nonvolatile storage with the SAS.

Example B3 is a data processing system according to Example B1, wherein the operation of determining the key tag value for the client comprises determining the key tag value to be used for the write request, based which client submitted the write request. Example B3 may also include the features of Example B2.

Example B4 is a data processing system according to Example B1, wherein the SED controller further enables the SED to respond to a read request for the region of the NVSM allocated to the client by determining, based on a key tag value in the read request, whether a MEK for the read request matches the MEK which was used to encrypt the data that was written to said region. Example B4 may also include the features of any one or more of Examples B2 through B3.

Example B5 is a data processing system according to Example B4, wherein the SED controller further enables the SED to store a UID for the MEK for the write request in the region of the NVSM allocated to the client, in connection with storing the encrypted data in said region. Also, the operation of determining whether the MEK for the read request matches the MEK which was used to encrypt the data that was written to said region comprises (a) using the key tag value in the read request to obtain a UID for the MEK for the read request; (b) reading the UID for the MEK for the write request from the NVSM; and (c) comparing the UID for the MEK for the read request with the UID for the MEK for the write request.

Example B6 is a data processing system according to Example B5, wherein the operation of storing the UID for the MEK for the write request in the region of the NVSM allocated to the client comprises (a) storing a first part of the UID in a first sector within the region of the NVSM allocated to the client; and (b) storing a second part of the UID in a second sector within the region of the NVSM allocated to the client.

Example B7 is a data processing system according to Example B1, wherein the region of the NVSM to hold the encrypted data comprises a first region of the NVSM. Also, the SED controller further enables the SED to (a) write encrypted data for the client to a second region of the NVSM, wherein the first and second regions are not contiguous; and (b) utilize the MEK for the client in conjunction with accessing the first region and in conjunction with accessing the second region. Example B7 may also include the features of any one or more of Examples B2 through B6.

Example C1 is a method for protecting data in an SED. The method comprises, (a) at an SED controller of the SED, receiving an eMEK for a client; (b) at the SED controller, decrypting the eMEK into an unencrypted MEK for the client; (c) receiving a write request from the client, wherein the write request includes data to be stored and a key tag value associated with the MEK; (d) using the key tag value to select the MEK for the write request; (e) using the MEK for the write request to encrypt the data from the client; and (f) using an NVSM responsive to the SED controller to store the encrypted data in a region of the NVSM allocated to the client.

Example C2 is a method according to Example C1, wherein the operation of receiving the eMEK for the client comprises receiving the eMEK for the client from a key management server.

Example C3 is a method according to Example C1, further comprising (a) storing a UID for the MEK for the write request in the region of the NVSM allocated to the client, in connection with storing the encrypted data in said region; and (b) responding to a read request for the region of the NVSM allocated to the client by determining, based on a key tag value in the read request, whether a MEK for the read request matches the MEK which was used to encrypt the data that was written to said region. Also, the operation of storing the UID for the MEK for the write request in the region of the NVSM allocated to the client comprises (a) storing a first part of the UID in a first sector within the region of the NVSM allocated to the client; and (b) storing a second part of the UID in a second sector within the region of the NVSM allocated to the client. Also, the operation of determining whether the MEK for the read request matches the MEK which was used to encrypt the data that was written to said region comprises (a) using the key tag value in the read request to obtain a UID for the MEK for the read request; (b) reading the UID for the MEK for the write request from the NVSM; and (c) comparing the UID for the MEK for the read request with the UID for the MEK for the write request. Example C3 may also include the features of Example C2.

Example C4 is a method according to Example C1, wherein the region of the NVSM to hold the encrypted data comprises a first region of the NVSM. Also, the method further comprises (a) writing encrypted data for the client to a second region of the NVSM, wherein the first and second regions are not contiguous; and (b) utilizing the MEK for the client in conjunction with accessing the first region and in conjunction with accessing the second region. Example C4 may also include the features of any one or more of Examples C2 through C3.

In view of the wide variety of useful permutations that may be readily derived from the example embodiments described herein, this detailed description is intended to be illustrative only, and should not be taken as limiting the scope of coverage.

What is claimed is:

1. A self-encrypting drive (SED) suitable for use in a data processing system, the SED comprising:
an SED controller; and
a nonvolatile storage medium (NVSM) responsive to the SED controller;
wherein the SED controller enables the SED to perform operations comprising:
receiving an encrypted media encryption key (eMEK) for a client;
decrypting the eMEK into an unencrypted media encryption key (MEK) for the client;
receiving a write request from the client, wherein the write request includes data to be stored and a key tag value associated with the MEK;
using the key tag value to select the MEK for the write request;
using the MEK for the write request to encrypt the data from the client;
storing the encrypted data in a first physical region of the NVSM allocated to the client;
writing encrypted data for the client to a second physical region of the NVSM, wherein the first and second physical regions are not contiguous; and
utilizing the MEK for the client in conjunction with accessing the first physical region and in conjunction with accessing the second physical region.

2. A data processing system according to claim 1, wherein the data processing system comprises:
a processor;
nonvolatile storage responsive to the processor;
storage appliance software (SAS) in the nonvolatile storage; and
an SED according to claim 1 responsive to the processor;
wherein the SAS enables the processor to receive the write request from the client and, in response to the write request, (a) determine the key tag value for the client, (b) include the key tag value for the client in the write request, and (c) forward the write request to the SED; and
wherein the operation of receiving the write request from the client comprises receiving the write request from the client via the SAS.

3. An SED according to claim 1, wherein the operation of receiving the eMEK for the client comprises:
receiving the eMEK for the client from a key management server.

4. An SED according to claim 1, wherein the SED controller further enables the SED to respond to a read request for the first physical region of the NVSM allocated to the client by (a) using a key tag value from the read request to obtain a unique identifier (UID) for a MEK for the read request and (b) determining whether the UID for the MEK for the read request matches a UID for the MEK for the write request.

5. An SED according to claim 4, wherein the SED controller enables the SED to:
store the UID for the MEK for the write request in the first physical region of the NVSM allocated to the client, in connection with storing the encrypted data in said region;
read the UID for the MEK for the write request from the NVSM; and
after obtaining the UID for the MEK for the read request and reading the UID for the MEK for the write request from the NVSM, compare the UID for the MEK for the read request with the UID for the MEK for the write request.

6. An SED according to claim 5, wherein the operation of storing the UID for the MEK for the write request in the first physical region of the NVSM allocated to the client comprises:
storing a first part of the UID in a first sector within the first physical region of the NVSM allocated to the client; and
storing a second part of the UID in a second sector within the first physical region of the NVSM allocated to the client.

7. An SED according to claim 5, wherein:
the MEK for the write request comprises a pair of AES-XTS keys according to an XEX-based tweaked-codebook mode with ciphertext stealing (XTS) process, involving XOR-encrypt-XOR (XEX) operations, according to an Advanced Encryption Standard (AES); and
the SED controller enables to SED to generate the UID for the MEK for the write request based on the pair of AES-XTS keys.

8. An SED according to claim 1, further comprising:
volatile storage; and
wherein the SED is configured to save the unencrypted MEK only in the volatile storage.

9. A data processing system, comprising:
a processor;
nonvolatile storage responsive to the processor;
storage appliance software (SAS) in the nonvolatile storage; and
a self-encrypting drive (SED) responsive to the processor, the SED comprising:
an SED controller and a nonvolatile storage medium (NVSM) responsive to the SED controller, wherein the SED controller enables the SED to perform operations comprising:
receiving an encrypted media encryption key (eMEK) for a client;
decrypting the eMEK into an unencrypted media encryption key (MEK) for the client;
receiving a write request from the client via the SAS, wherein the write request includes data to be stored and a key tag value associated with the MEK;
using the key tag value to select the MEK for the write request;
using the MEK for the write request to encrypt the data from the client;
storing the encrypted data in a first physical region of the NVSM allocated to the client;
writing encrypted data for the client to a second physical region of the NVSM, wherein the first and second physical regions are not contiguous; and
utilizing the MEK for the client in conjunction with accessing the first physical region and in conjunction with accessing the second physical region; and
wherein the SAS enables the processor to receive the write request from the client and, in response to the write request, (a) determine the key tag value for the client, (b) include the key tag value for the client in the write request, and (c) forward the write request to the SED.

10. A data processing system according to claim 9, wherein the NVSM responsive to the SED controller comprises the nonvolatile storage with the SAS.

11. A data processing system according to claim 9, wherein the operation of determining the key tag value for the client comprises:
determining the key tag value to be used for the write request, based which client submitted the write request.

12. A data processing system according to claim 9, wherein the SED controller further enables the SED to respond to a read request for the first physical region of the NVSM allocated to the client by (a) using a key tag value from the read request to obtain a unique identifier (UID) for a MEK for the read request, and (b) determining whether the UID for the MEK for the read request matches a UID for the MEK for the write request.

13. A data processing system according to claim 12, wherein the SED controller enables the SED to:
store the UID for the MEK for the write request in the first physical region of the NVSM allocated to the client, in connection with storing the encrypted data in said region;
read the UID for the MEK for the write request from the NVSM; and
after obtaining the UID for the MEK for the read request and reading the UID for the MEK for the write request from the NVSM, compare the UID for the MEK for the read request with the UID for the MEK for the write request.

14. A data processing system according to claim 13, wherein the operation of storing the UID for the MEK for the write request in the first physical region of the NVSM allocated to the client comprises:
storing a first part of the UID in a first sector within the first physical region of the NVSM allocated to the client; and
storing a second part of the UID in a second sector within the first physical region of the NVSM allocated to the client.

15. A method for protecting data in a self-encrypting drive (SED), the method comprising:
at an SED controller of the SED, receiving an encrypted media encryption key (eMEK) for a client;
at the SED controller, decrypting the eMEK into an unencrypted media encryption key (MEK) for the client;
receiving a write request from the client, wherein the write request includes data to be stored and a key tag value associated with the MEK;
using the key tag value to select the MEK for the write request;
using the MEK for the write request to encrypt the data from the client;
using a nonvolatile storage medium (NVSM) responsive to the SED controller to store the encrypted data in a first physical region of the NVSM allocated to the client;
writing encrypted data for the client to a second physical region of the NVSM, wherein the first and second physical regions are not contiguous; and
utilizing the MEK for the client in conjunction with accessing the first physical region and in conjunction with accessing the second physical region.

16. A method according to claim 15, wherein the operation of receiving the eMEK for the client comprises:
receiving the eMEK for the client from a key management server.

17. A method according to claim 15, further comprising:
responding to a read request for the first physical region of the NVSM allocated to the client by (a) using a key tag value from the read request to obtain a unique identifier (UID) for a MEK for the read request, and (b) determining whether the UID for the MEK for the read request matches a UID for the MEK for the write request.

18. A method according to claim 17, further comprising:
storing the UID for the MEK for the write request in the first physical region of the NVSM allocated to the client, in connection with storing the encrypted data in said region;
reading the UID for the MEK for the write request from the NVSM; and
after obtaining the UID for the MEK for the read request and reading the UID for the MEK for the write request from the NVSM, comparing the UID for the MEK for the read request with the UID for the MEK for the write request.

* * * * *